US012442587B2

United States Patent
Lee et al.

(10) Patent No.: US 12,442,587 B2
(45) Date of Patent: Oct. 14, 2025

(54) REFRIGERATOR

(71) Applicant: LG ELECTRONICS INC., Seoul (KR)

(72) Inventors: Sanggyun Lee, Seoul (KR); Younseok Lee, Seoul (KR); Yongwon Dong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 18/269,698

(22) PCT Filed: Jan. 6, 2022

(86) PCT No.: PCT/KR2022/000247
§ 371 (c)(1),
(2) Date: Jun. 26, 2023

(87) PCT Pub. No.: WO2022/149883
PCT Pub. Date: Jul. 14, 2022

(65) Prior Publication Data
US 2024/0060707 A1    Feb. 22, 2024

(30) Foreign Application Priority Data
Jan. 6, 2021  (KR) ........................ 10-2021-0001443

(51) Int. Cl.
*F25D 23/02*    (2006.01)
(52) U.S. Cl.
CPC ........ *F25D 23/028* (2013.01); *F25D 2323/02* (2013.01)
(58) Field of Classification Search
CPC ............... F25D 23/028; F25D 2323/02; F25D 2323/024; F25D 23/126; F25D 2400/40;
(Continued)

(56) References Cited

U.S. PATENT DOCUMENTS 5,263,509 A * 11/1993 Cherry ................. F25D 23/126
                                                            312/401
6,192,630 B1    2/2001 Banicevic
(Continued)

FOREIGN PATENT DOCUMENTS

AT           501848 B1 *  4/2007   ........... G02B 6/4461
CN        101167225        4/2008
(Continued)

OTHER PUBLICATIONS

U.S. Office Action dated Sep. 26, 2024 issued in U.S. Appl. No. 18/270,824.
(Continued)

*Primary Examiner* — Hanh V Tran
(74) *Attorney, Agent, or Firm* — KED & ASSOCIATES, LLP

(57) ABSTRACT

A refrigerator of the present embodiment comprises: a cabinet having a storage space; a refrigerator door which is rotatably connected to the cabinet by a hinge apparatus and opens and closes the storage space; an extension member which is drawn out from the cabinet and connected to the inside of the refrigerator door through a door opening spaced apart from the rotational center of the refrigerator door, the extension member including at least one of a wire or a tube through which a liquid flows; a guide housing for guiding the extension member positioned outside the cabinet and the refrigerator door; and a cabinet guide which is fixed to the cabinet and guides linear and rotational movements of the guide housing during the opening and closing of the refrigerator door.

20 Claims, 16 Drawing Sheets

(58) Field of Classification Search
CPC . F25D 23/10; E05D 11/00; E05D 3/02; E05D 3/06; E05Y 2900/31
See application file for complete search history.

(56) References Cited

U.S. PATENT DOCUMENTS

| | | | | |
|---|---|---|---|---|
| 9,024,188 | B2 * | 5/2015 | Lacey, Jr. | H02G 3/0608 174/68.3 |
| 9,115,928 | B2 * | 8/2015 | Akalan | F25D 23/028 |
| 9,328,954 | B2 * | 5/2016 | Kang | E05D 11/0081 |
| 11,774,165 | B2 * | 10/2023 | Oh | E05D 11/0054 312/405 |
| 2006/0064846 | A1 | 3/2006 | Espindola | |
| 2013/0047656 | A1 | 2/2013 | Kang et al. | |
| 2013/0092802 | A1 * | 4/2013 | Doberstein | D06F 39/14 248/70 |
| 2014/0210328 | A1 | 7/2014 | Akalan | |
| 2016/0195325 | A1 | 7/2016 | Kim et al. | |
| 2016/0245579 | A1 | 8/2016 | Eom | |
| 2018/0148962 | A1 | 5/2018 | Jung | |
| 2018/0187956 | A1 * | 7/2018 | Kim | F25D 23/02 |
| 2021/0010745 | A1 | 1/2021 | Choi | |
| 2022/0057133 | A1 | 2/2022 | Oh | |

FOREIGN PATENT DOCUMENTS

| | | | | |
|---|---|---|---|---|
| CN | 103648846 B * | 2/2016 | | B60R 16/0215 |
| CN | 105486010 | 2/2018 | | |
| CN | 109959212 | 7/2019 | | |
| CN | 110130758 A * | 8/2019 | | |
| CN | 110398121 | 11/2019 | | |
| CN | 110398121 A * | 11/2019 | | |
| CN | 110793263 A * | 2/2020 | | F25C 1/25 |
| CN | 110130758 | 11/2020 | | |
| CN | 110130758 B * | 11/2020 | | |
| EP | 1821052 A2 * | 8/2007 | | F25D 23/02 |
| EP | 1894789 | 10/2011 | | |
| EP | 2741035 A2 * | 6/2014 | | B23P 15/26 |
| EP | 3343152 A1 * | 7/2018 | | E05D 11/0054 |
| JP | 2006-168433 | 6/2006 | | |
| JP | 6755402 | 9/2020 | | |
| KR | 10-2007-0121056 | 12/2007 | | |
| KR | 10-2009-0074936 | 7/2009 | | |
| KR | 10-2010-0054353 | 5/2010 | | |
| KR | 10-0988023 | 10/2010 | | |
| KR | 101519144 B1 * | 5/2015 | | |
| KR | 10-2016-0102681 | 8/2016 | | |
| KR | 10-2018-0080032 | 7/2018 | | |
| KR | 20200067415 | 6/2020 | | |
| KR | 20200067415 A * | 6/2020 | | |

OTHER PUBLICATIONS

International Search Report dated Apr. 20, 2022 issued in Application No. PCT/KR2022/000245.
International Search Report dated Apr. 19, 2022 issued in Application No. PCT/KR2022/000143.
International Search Report dated Apr. 19, 2022 issued in Application No. PCT/KR2022/000150.
Extended European Search Report dated Oct. 17, 2024 issued in Application No. 22736859.4.
International Search Report dated Apr. 20, 2022 issued in Application No. PCT/KR2022/000247.
U.S. Appl. No. 18/270,821, filed Jul. 3, 2023.
U.S. Appl. No. 18/269,698, filed Jun. 26, 2023.
U.S. Appl. No. 18/270,824, filed Jul. 3, 2023.
U.S. Appl. No. 18/270,829, filed Jul. 3, 2023.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2022/000247, filed Jan. 6, 2022, which claims priority to Korean Patent Application No. 10-2021-0001443, filed Jan. 6, 2021, whose entire disclosures are hereby incorporated by reference.

TECHNICAL FIELD

This specification relates to a refrigerator.

BACKGROUND ART

In general, a refrigerator is a home appliance that stores food at a low temperature in a storage space of an interior shielded by a refrigerator door, and the refrigerator is configured to keep the stored food in an optimal condition by cooling the inside of the storage space using cold air generated through heat exchange with a refrigerant circulating in the refrigeration cycle.

The refrigerator may be independently placed in a kitchen, a living room, or the like, or may be stored in a furniture cabinet of a kitchen.

Refrigerators are gradually becoming larger and more multi-functional in accordance with changes in eating habits and the trend of high quality products, and refrigerators equipped with various structures and convenient devices considering user convenience are being released.

In Korean Patent Publication No. 10-2010-0054353, which is a prior document, a refrigerator is disclosed.

The refrigerator includes a main body having a storage space, a door that selectively shields the storage space of the main body, and a wire harness connecting various electric and electronic components including a plurality of sensors and switches provided in the main body and the door, and a harness guide accommodating the wire harness.

The harness guide includes a first guide connected to have a rotational shaft fixed to one side of the main body, and a second guide having a rotational shaft at one side of the door and connected to the first guide.

However, in the case of the prior document, the first guide and the second guide are each formed in a curved shape, and the wire harness exists in a bent state within each guide in a state where the door is closed. When the door is opened, the wire harness is deformed into an unfolded state by the rotation of each guide.

In the case of this prior document, the amount of deformation of the wire harness is large when the door is opened and closed, and thus there is a risk of damage to the wire harness.

In the case of the prior document, since the wire harness is exposed to the outside in a state where each guide accommodates the wire harness, there is a risk of damage to the wire harness due to external obstacles.

In addition, a water hose for supplying water to a dispenser, an ice maker, or the like may be also accommodated in the wire harness.

However, as in the prior document, when the amount of bending of the water hose is large in a state where the door is closed, the water hose tends to be stretched by the tension of the water hose. When the door is opened in this state, the water hose is excessively bent in the opposite direction when being stretched, and as a result, there is a risk of damage to the water hose, and in this case, there is a risk of water leakage.

DISCLOSURE

Technical Problem

The present embodiment provides a refrigerator in which bending of a wire and/or a water pipe located in a guide housing is minimized in a state in which the door is closed.

Optionally or additionally, the present embodiment provides a refrigerator in which the guide housing can stably move during the door opening process.

Optionally or additionally, the present embodiment provides a refrigerator in which the amount of bending of a wire and/or a water pipe is minimized while the door is opened.

Technical Solution

A refrigerator according to an aspect may include a cabinet having a storage space; a refrigerator door rotatably connected to the cabinet by a hinge apparatus and opening and closing the storage space; an extension member drawn out from the cabinet, extending to an inside of the refrigerator door, and including at least one of a wire or a pipe through which liquid flows; a guide housing for guiding the extension member located outside the cabinet and the refrigerator door; and a cabinet guide fixed to the cabinet and guiding movement of the guide housing while the refrigerator door is opened and closed.

The cabinet guide may guide at least one of linear movement and rotational motion of the guide housing while the refrigerator door is opened and closed.

In a state in which the refrigerator door is closed, the guide housing positioned on the cabinet guide may be disposed in a straight line form or a form nearly similar to the straight line.

The extension member may be introduced into the refrigerator door through a door opening spaced apart from a rotational center of the refrigerator door.

The guide housing may be configured by combining a plurality of separate housings. Each of the plurality of separate housings may be relatively rotatable with adjacent separate housing.

The cabinet guide may include a bottom wall fixed to the cabinet.

The cabinet guide may further include first and second side walls extending upward from both sides of the bottom wall.

The guide housing may be positioned between the first sidewall and the second sidewall.

At least one of the first sidewall and the second sidewall may be provided with a guide slot extending in a longitudinal direction of the cabinet guide. The guide housing may be provided with a guide rib accommodated in the guide slot.

A distance between the first sidewall and the second sidewall may be greater than a width of the guide housing in the left and right direction.

The second sidewall may be located closer to the hinge apparatus than the first sidewall. The second sidewall may include an inclined wall inclined in a direction away from the first sidewall. The inclined wall may be located at a portion of the second side wall adjacent to the refrigerator door.

The cabinet guide may include a third sidewall extending rearwardly from the first sidewall and a fourth sidewall extending rearwardly from the second sidewall. Upper ends of the third and fourth sidewalls may be positioned lower than upper ends of the first and second sidewalls.

At least one of the third sidewall and the fourth sidewall may be provided with a limiting wall protruding in a direction facing the sidewall. The guide housing may include a limiting rib protruding from the guide housing in a horizontal direction and positioned below the limiting wall.

A limiting wall may be provided on each of the third sidewall and the fourth sidewall. A distance between the limiting walls may be greater than a width of the guide housing in the left and right direction.

The cabinet guide may further include a guide portion extending in one direction and guiding the pipe toward the guide housing.

The guide portion may include an extension wall extending in a horizontal direction. The guide portion may further include a support wall extending from the extension wall in a direction away from the refrigerator door and supporting the pipe.

The extension wall may be provided with an opening through which the pipe passes.

A height of the support wall may increase in a direction away from the refrigerator door.

The vertical cross section of the support wall may be rounded to be convex downward.

The guide may further include a connection wall connecting the support wall and the extension wall.

The guide portion may be located behind the hinge apparatus. A portion of the hinge apparatus may be positioned between the guide portion and the refrigerator door.

The refrigerator may further include one or more cover members coupled to the guide portion to surround the pipe seated on the support wall.

The cabinet guide may further include a fixing wall used for fixing the wire. The cabinet guide may further include a coupling member coupled to the fixing wall.

In a state in which the wire is positioned between the coupling member and one side wall of the cabinet guide, the wire may be coupled to the coupling member by a cable tie.

The fixing wall may be located on the opposite side of the guide portion from the cabinet guide.

The fixing wall may be provided with a plurality of holes in a first direction and a plurality of holes in a direction crossing the first direction.

The cabinet guide may further include one or more coupling walls extending in a horizontal direction and seated on an upper surface of the cabinet.

The at least one coupling wall may be provided with a through-hole through which a fastening member passes.

Advantageous Effect

According to the present embodiment, since the guide housing is disposed in a straight line form or in a form similar to a straight line by the cabinet guide in a state in which the door is closed, bending of the wire and/or water pipe located in the guide housing can be minimized.

According to this embodiment, since the guide housing moves in a state of being guided by the cabinet guide, stable movement of the guide housing is possible.

According to this embodiment, since the guide housing accommodating the wire and/or the water pipe is guided by the cabinet guide during the opening process of the door, the bending amount of the wire and/or the water pipe can be minimized.

BEST MODE

Figure 1:
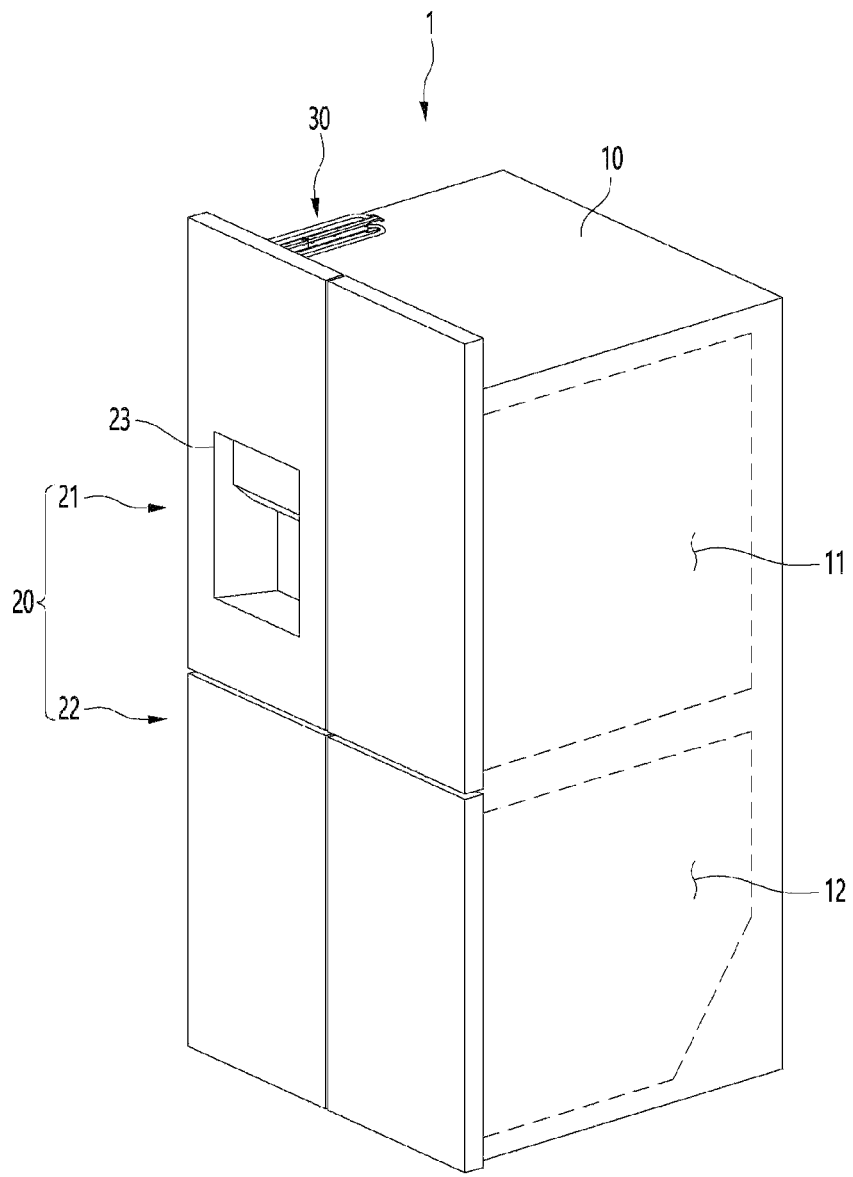
FIG. 1 is a perspective view illustrating a refrigerator according to the present embodiment.

Hereinafter, some embodiments of the present disclosure will be described in detail through exemplary drawings. In adding reference numerals to components of each drawing, it should be noted that the same components have the same numerals as much as possible even if they are displayed on different drawings. In addition, in describing an embodiment of the present disclosure, if it is determined that a detailed description of a related known configuration or function hinders understanding of the embodiment of the present disclosure, the detailed description is omitted.

Also, terms such as first, second, A, B, (a), (b) or the like may be used herein when describing components of the embodiment of the present disclosure. Each of these terminologies is not used to define an essence, order or sequence of a corresponding component but used merely to distinguish the corresponding component from other component(s). It should be noted that when a component is described as being "connected," "coupled," or "joined" to another component, that component may be directly connected or joined to the other component, but another component may be "connected", "coupled" or "joined" between each component.

Figure 2:
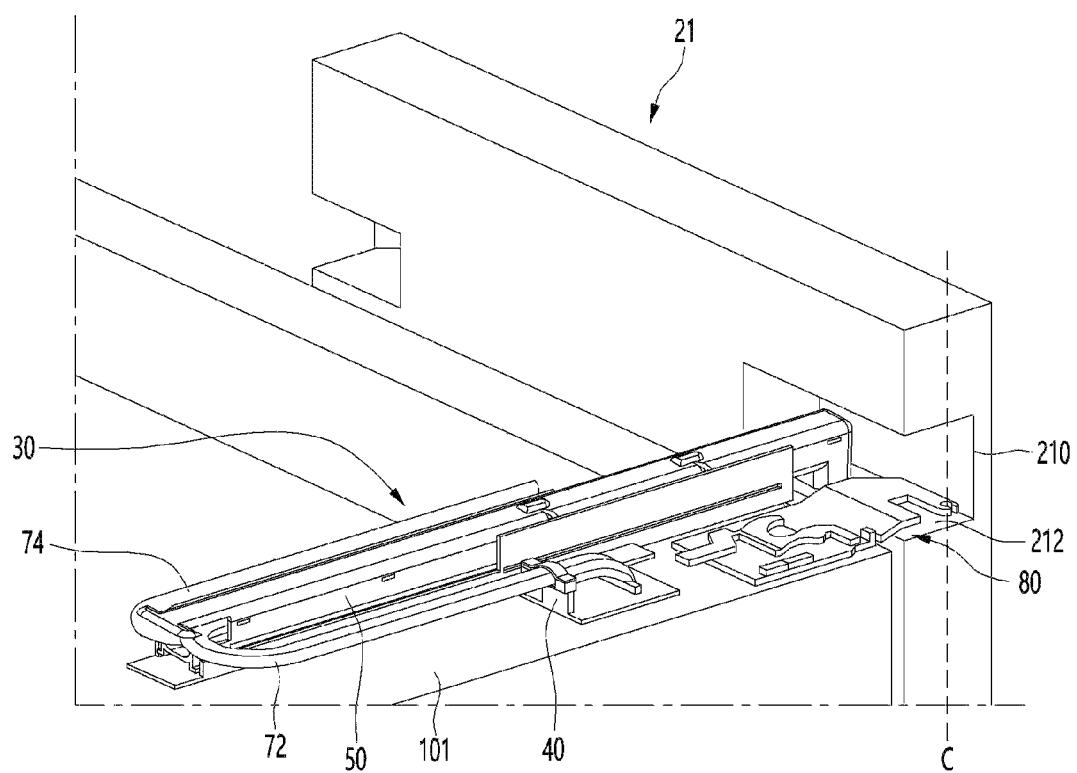
FIG. 2 is a perspective view illustrating a state where a guide unit is connected to a cabinet and a door.
Figure 3:
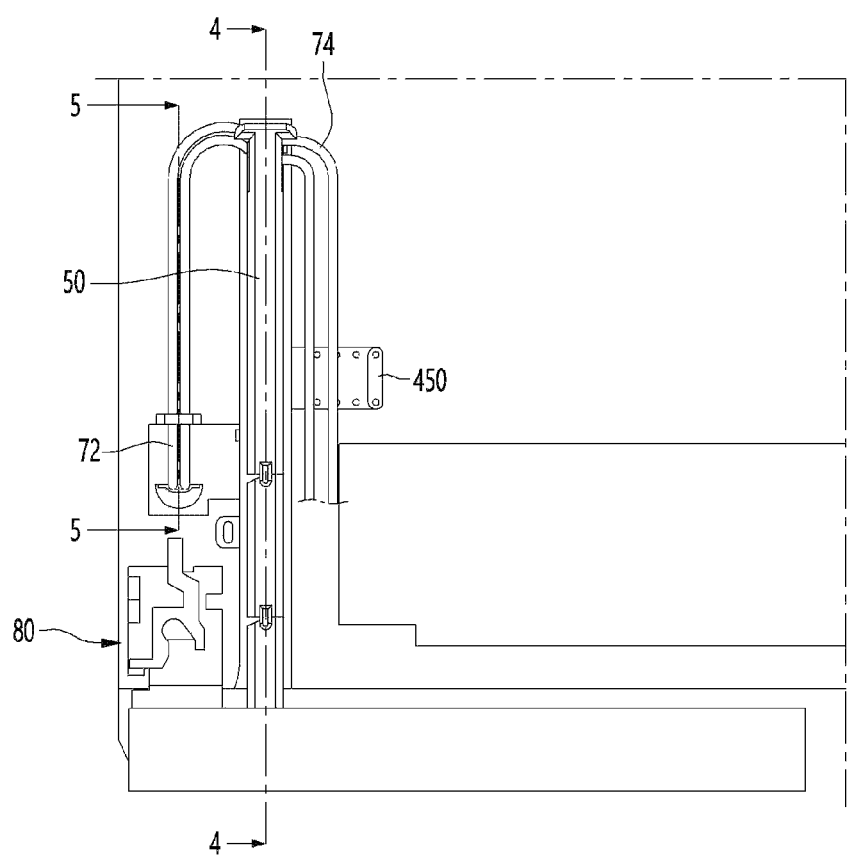
FIG. 3 is a plan view illustrating a state where a guide unit is connected to a cabinet and a door.
Figure 4:
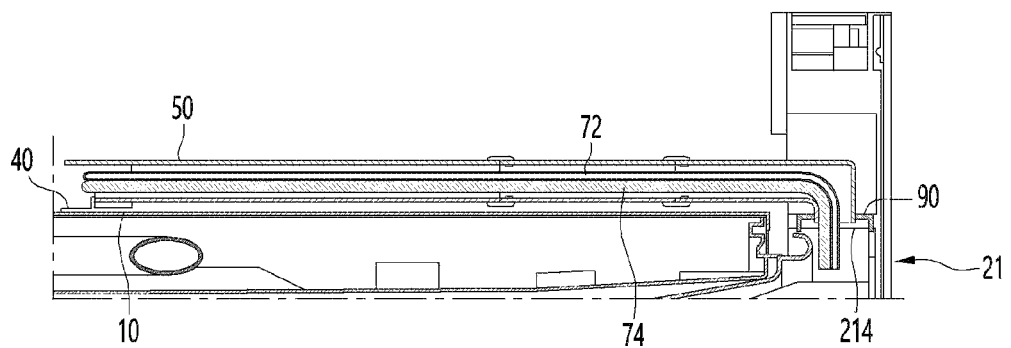
FIG. 4 is a cross-sectional view taken along line 4-4 of FIG. 3.
Figure 5:
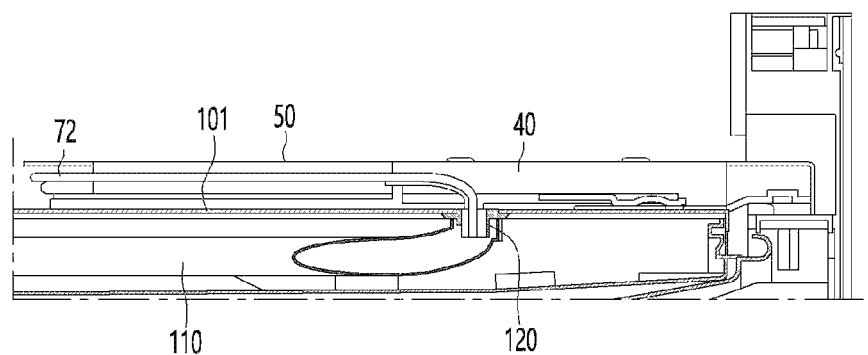
FIG. 5 is a cross-sectional view taken along line 5-5 of FIG. 3.

FIG. 1 is a perspective view illustrating a refrigerator according to the present embodiment, FIG. 2 is a perspective view illustrating a state where a guide unit is connected to a cabinet and a door, FIG. 3 is a plan view illustrating a state where a guide unit is connected to a cabinet and a door, FIG. 4 is a cross-sectional view taken along line 4-4 of FIG. 3, and FIG. 5 is a cross-sectional view taken along line 5-5 of FIG. 3.

Referring to FIGS. 1 to 5, the refrigerator 1 according to the present embodiment may be installed independently in a kitchen or installed in a form accommodated in an indoor furniture cabinet.

When the refrigerator 1 is installed in an indoor furniture cabinet, the refrigerator 1 may be installed alone or arranged with other refrigerators in the left and right direction.

The refrigerator 1 may include a cabinet 10 having a storage space and a refrigerator door 20 opening and closing the storage space.

The storage space is not limited, but may be divided into an upper first space 11 and a lower second space 12, and the refrigerator door 20 also may include a first door 21 which opens and closes the first space 11 and a second door 22 which opens and closes the second space 12.

The first space 11 may be a refrigerating chamber, and the second space 12 may be a freezing chamber or vice versa. Alternatively, the storage space may include a first space and a second space divided into left and right sides. Alternatively, the storage space may be a single space, and a single refrigerator door may open and close the storage space.

At least one of the first door 21 and the second door 22 may be a rotation type door. Alternatively, the single refrigerator door 20 may be a rotation type door.

In the present embodiment, for example, the state where the two first doors 21 are disposed in the left and right direction will be described.

The first door 21 may be rotatably connected to the cabinet 10 by a hinge apparatus 80. The hinge apparatus 80 may include a hinge pin providing a rotational center C of the first door 21.

Any one of the two first doors 21 may include a dispenser 23. The dispenser 23 may discharge water and/or ice. FIG. 1 illustrates that the dispenser 23 is provided in the first door 21 on the left side as an example.

Although not illustrated, a component that operates to discharge water and/or ice may be provided in the first door 21. The component may be electrically connected to the wire 74. Alternatively, apart from the components, the first door 21 may include a display and/or an input portion, and the display and/or input unit may be electrically connected to the wire 74.

For example, the wire 74 is connected to a controller provided in the cabinet 10, and is introduced into the first door 21 and directly or indirectly (when connected to a separate wire provided inside the first door) can be connected to the above components.

In order for the dispenser 23 to discharge water, the dispenser 23 may be connected to a water pipe 72 (or a liquid pipe through which liquid other than water flows). The water pipe 72 may be introduced into the first door 21 through the first door 21 after being drawn out from the inside of the cabinet 10.

In this specification, it should be noted that the fact that the wire 74 and/or the water pipe 72 is introduced into the first door 21 or the cabinet 10 is also interpreted that, on the contrary, the wire 74 and/or the water pipe 72 is drawn out from the first door 21 or the cabinet 10.

The water pipe 72 may be introduced into the first door 21 and directly or indirectly connected to the dispenser 23 (when connected to a separate additional water pipe provided inside the first door).

In the present embodiment, one or more of the water pipe 72 and the wire 74 may be introduced into the first door 21.

FIG. 2 illustrates, for example, that the water pipe 72 and the wire 74 are introduced into the first door 21.

When the refrigerator 1 is installed in a furniture cabinet in a kitchen, the refrigerator door 20 may generally protrude toward the front of the cabinet, although it may vary depending on the size of the cabinet. In order to prevent the refrigerator door 20 from protruding forward of the furniture cabinet, it may be considered to reduce the thickness of the refrigerator door 20.

In the case of a general refrigerator 1, since the thickness of the refrigerator door 20 is thick, the diameter of the hinge pin of the hinge apparatus 80 can be increased, and in this case, the water pipe 72 and the wire 74 can pass through hinge pins.

However, when the thickness of the refrigerator door 20 is reduced, the diameter of the hinge pin must be reduced. When the diameter of the hinge pin is reduced, the water pipe 72 and the wire 74 cannot pass through the hinge pin. In this case, the water pipe 72 and the wire 74 may pass through the refrigerator door 20 at a position spaced apart from the hinge apparatus and be introduced into the refrigerator door 20.

In the case of the present embodiment, the water pipe 72 and the wire 74 may pass through the first door 21 at one side of the hinge apparatus 80 in the first door 21.

The present embodiment may further include a guide unit 30 for guiding the water pipe 72 and the wire 74.

The guide unit 30 protects the water pipe 72 and the wire 74 and can be minimized exposure of the water pipe 72 and the wire 74 to the outside while the first door 21 is opened.

The guide unit 30 may include a guide housing 50 accommodating the water pipe 72 and the wire 74. The guide unit 30 may further include a cabinet guide 40 fixed to the cabinet 10 and guiding movement of the guide housing 50.

The cabinet guide 40 may be coupled to a position adjacent to the hinge apparatus 80 in the cabinet 10.

The water pipe 72 may be drawn out from the cabinet 10 directly behind the hinge apparatus 80 and accommodated in the guide housing 50.

The water pipe 72 drawn out from the cabinet 10 may be introduced into the guide housing 50 from the rear side of the guide housing 50 after being extended rearward.

A protective guide 120 may be provided on the upper wall 101 of the cabinet 10 to protect the water pipe 72 while the water pipe 72 passes therethrough.

A guide pipe 110 connected to the protective guide 120 and guiding the water pipe 72 may be provided inside the cabinet 10.

The wire 74 is located on the opposite side of the water pipe 72 based on the guide housing 50 and may be introduced into the guide housing 50 from the rear side of the guide housing 50.

Accordingly, the water pipe 72 and the hinge apparatus 80 may be positioned on one side of the guide housing 50, and the wire 74 may be positioned on the other side thereof.

In a state in which the first door 21 is closed, the guide housing 50 may extend in a straight line form. Referring to FIG. 3, the guide housing 50 may extend in a straight line in the front and rear direction. In the present embodiment, "straight line form" may mean a form close to a straight line as well as a perfect straight line.

Accordingly, the water pipe 72 and the wire 74 may also be guided toward the first door 21 in a straight line form within the guide housing 50.

The upper surface of the first door 21 may be located higher than the upper surface of the cabinet 10. In order for the guide housing 50 to be connected to the first door 21, the first door 21 may include a recessed portion 210.

The recessed portion 210 may be formed as the rear surface of the first door 21 is recessed forward or as the side surface of the first door 21 is recessed. The recessed portion 210 may be disposed at a position spaced downward from the upper surface of the first door 21.

Substantially, the bottom 212 of the recessed portion 210 may be located at the same height as or substantially similar to the top surface of the cabinet 10. Of course, the upper surface of the first door 21 may have the same or similar height as the upper surface of the cabinet 10.

A portion of the hinge apparatus 80 may be introduced into the recessed portion 210 and connected to the bottom 212.

When the first door 21 is closed, a portion of the guide housing 50 extending in a straight line form is introduced into the recessed portion 210 and can be connected to the bottom 212 by the door fixing portion 90.

In the case of the present embodiment, the water pipe 72 and the wire 74 are guided to the recessed portion 210 of the first door 21 in a straight line form within the guide housing 50, so that bending of the water pipe 72 and the wire 74 in the guide housing 50 can be minimized.

A door opening 214 may be formed at the bottom 212 of the recessed portion 210. The water pipe 72 and the wire 74 guided to the recessed portion 210 may pass through the door opening 214 and be introduced into the first door 21. Alternatively, the water pipe 72 and the wire 74 drawn out from the inside of the first door 21 through the door opening 214 may be guided toward the cabinet 10 by the guide housing 50.

Hereinafter, the guide housing will be described in detail.

Figure 6:
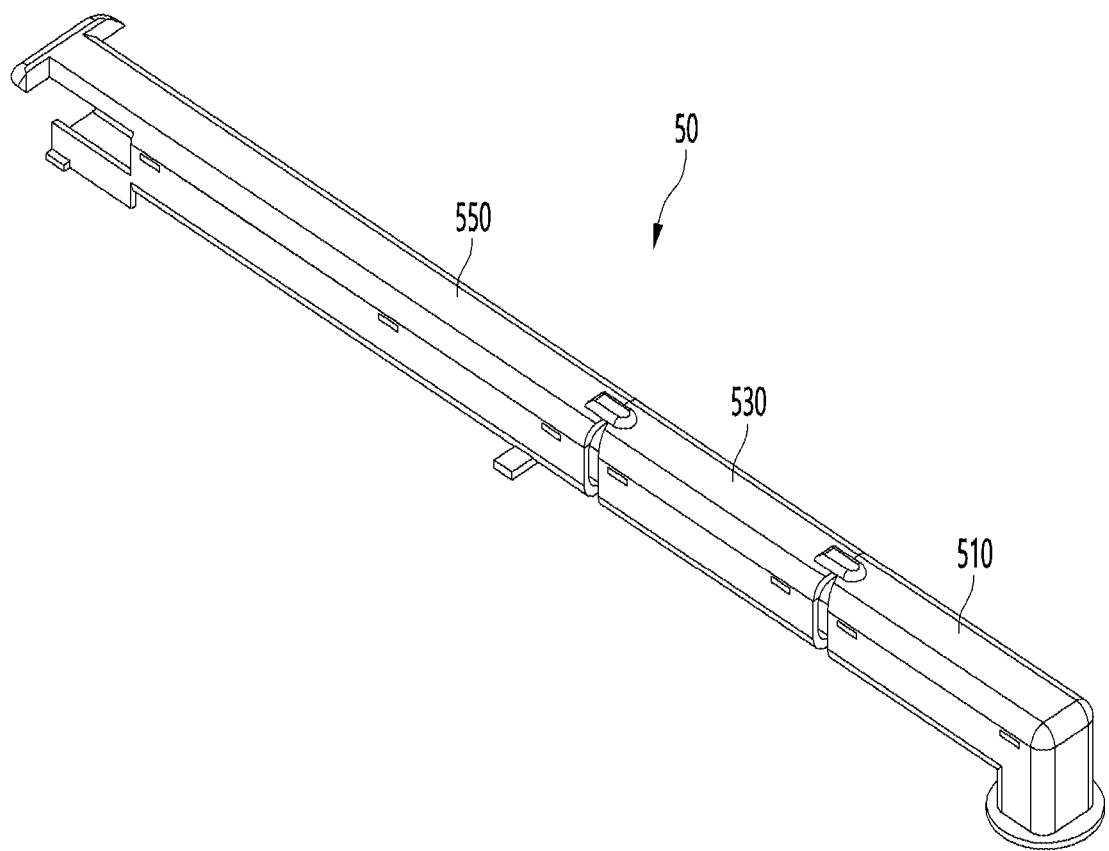
FIG. 6 is a perspective view illustrating the guide housing of the present embodiment.
Figure 7:
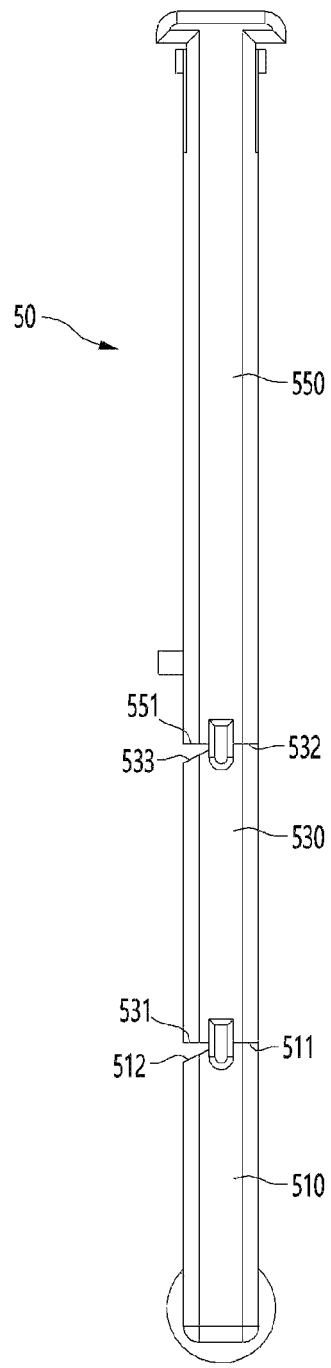
FIG. 7 is a plan view illustrating the guide housing of the present embodiment.
Figure 8:
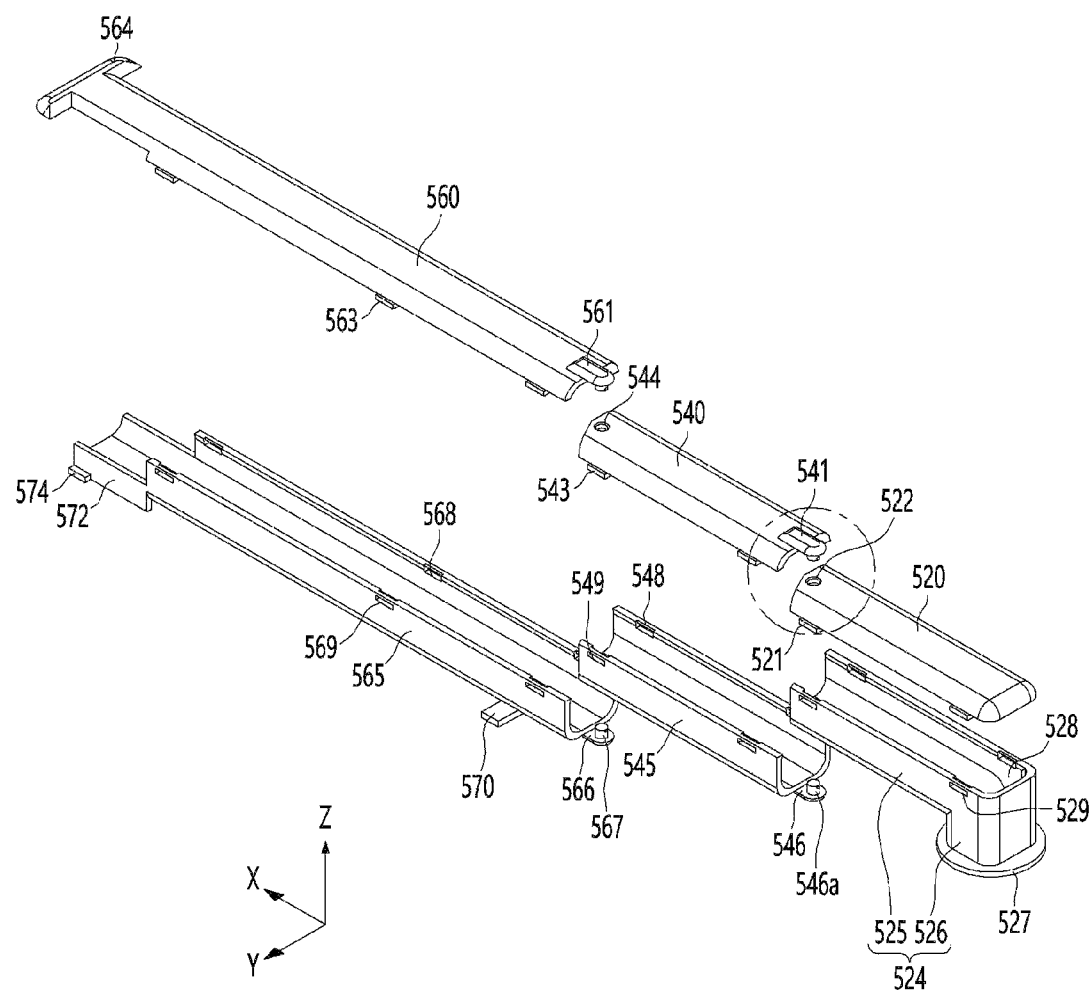
FIG. 8 is an exploded perspective view illustrating the guide housing of the present embodiment.
Figure 9:
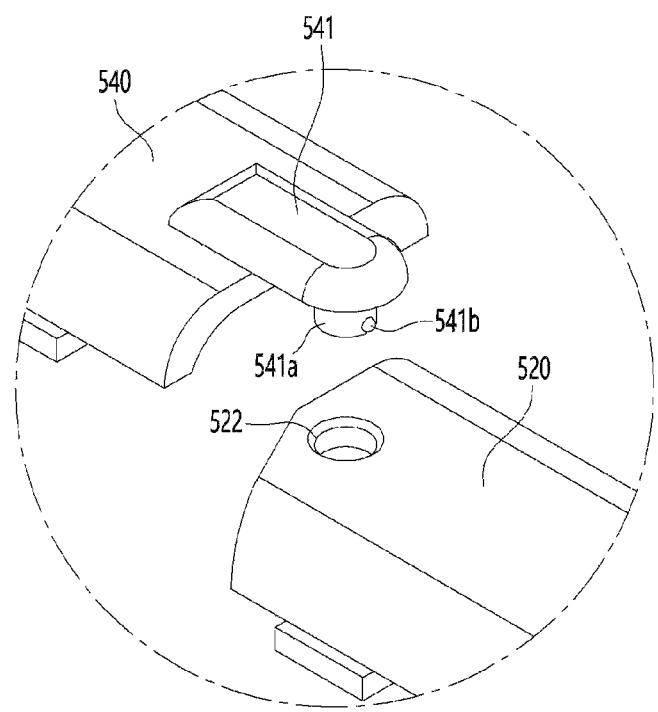
FIG. 9 is a view illustrating a coupling structure of a first housing and a second housing.
Figure 10:
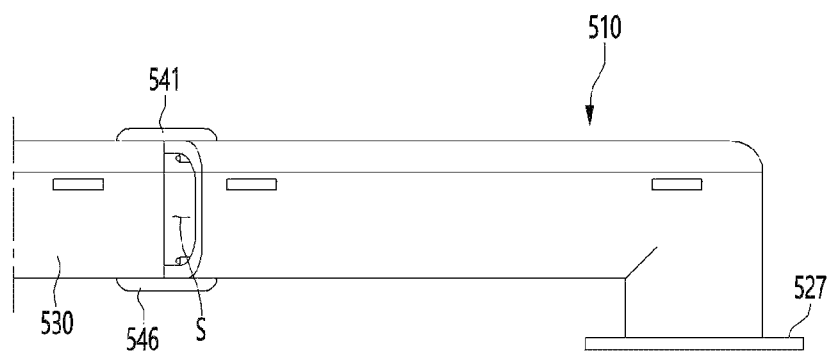
FIG. 10 is a side view illustrating a state where the first housing and the second housing are coupled.

FIG. 6 is a perspective view illustrating the guide housing of the present embodiment, FIG. 7 is a plan view illustrating the guide housing of the present embodiment, FIG. 8 is an exploded perspective view illustrating the guide housing of the present embodiment, FIG. 9 is a view illustrating a coupling structure of a first housing and a second housing, and FIG. 10 is a side view illustrating a state where the first housing and the second housing are coupled.

Referring to FIGS. 6 to 10, the guide housing 50 may be formed by combining a plurality of separate housings.

The guide housing 50 may include, for example, a first housing 510 and a second housing 520.

The first housing 510 may be rotatably connected to the first door 21. In the present embodiment, the first housing 510 may be referred to as a door connection housing.

The second housing 530 may be rotatably connected to the first housing 510.

The guide housing 50 may further include a third housing 550.

The third housing 550 may be rotatably connected to the second housing 530 and may be movably connected to the cabinet guide 40. In the present embodiment, the third housing 550 may be referred to as a guide connection housing or a cabinet connection housing.

In the present embodiment, the second housing 530 may be referred to as an intermediate housing positioned between the first housing 510 and the third housing 550.

In the present embodiment, it is disclosed that one intermediate housing is provided between the first housing 510 and the third housing 550, but a plurality of intermediate housings may be provided otherwise.

However, when the number of intermediate housings increases, the overall structure of the guide housing becomes complicated and the assembly process thereof becomes complicated, so it may be preferable that one or two intermediate housings are provided between the first housing 510 and the third housing 550.

A portion of the first housing 510 may be extended in a straight line form in a horizontal direction and another portion of the first housing 510 may be bent and extending in a vertical direction. A portion extending in the vertical direction may be connected to the first door 21.

Accordingly, the water pipe 72 and the wire 74 extending in the horizontal direction by the first housing 510 are bent to pass through the first door 21 in the vertical direction.

The first housing 510 may include a first upper housing 520 and a first lower housing 524 coupled to the first upper housing 520.

By combining the first upper housing 520 and the first lower housing 524, a passage through which the water pipe 72 and the wire 74 can be positioned may be formed. In another aspect, the first lower housing 524 may form the passage and the first upper housing 520 may cover the passage.

When the water pipe 72 and the wire 74 are accommodated in the first housing 510, exposure of the water pipe 72 and the wire 74 to the outside can be minimized.

For example, the first lower housing 524 may include a horizontal extension portion 525 and an upper and lower extension portion 526 bent at an end portion of the horizontal extension portion. The first upper housing 520 may be coupled to the horizontal extension portion 525.

Accordingly, the water pipe 72 and the wire 74 extending in the horizontal direction by the horizontal extension portion 525 may be bent by the upper and lower extension portion 526 and extend in the vertical direction.

A flange 527 may be provided at a lower end of the upper and lower extension portion 526. A line extending along the outer circumference of the flange 527 may be, for example, circular. The flange 527 may be seated on the first door 21 and relatively rotated with respect to the first door 21.

The first upper housing 520 may include a hook 521 for coupling with the first lower housing 524. For example, hooks 521 may be provided on both sides of the first upper housing 520, respectively. A plurality of hooks 521 may be provided in the longitudinal direction (X-axis direction) of the first upper housing 520 to increase the coupling force between the first upper housing 520 and the first lower housing 524. In the present embodiment, the "longitudinal direction" may be the front and rear direction of the refrigerator or the extension direction of the water pipe 72 and the wire 74 in the horizontal extension portion 525.

The first lower housing 524 may include a hook slot 529 to which the hook 521 is coupled. The number of hook slots 529 is the same as the number of hooks 521.

The first upper housing 520 and the first lower housing 524 may be coupled in a direction crossing the longitudinal direction (for example, a Z-axis direction).

For example, the first upper housing 520 may be coupled to the first lower housing 524 while moving downward. The first lower housing 524 may include a guide groove 528 for guiding the hook 521 when the first upper housing 520 is coupled with the first lower housing 520. The guide groove 528 may be formed as a portion of the upper surface of the first upper housing 520 is recessed downward. Alternatively, the guide groove 528 may be formed as a portion of the inner surface of the first upper housing 520 is recessed outward.

The hook slot 529 may be located at a position corresponding to the lower end portion of the guide groove 528. Accordingly, when the hook 521 is aligned with the hook slot 529 while moving downward along the guide groove 528, the hook 521 can be inserted into and coupled to the hook slot 529.

Contrary to what has been described above, it is also possible that the first lower housing 524 includes a hook and the first upper housing 520 includes a hook slot and a hook groove.

The first housing 510 may be rotatably connected to the second housing 530. To this end, the first housing 510 may include a hinge hole 522.

The hinge hole 522 may be formed in each of the first upper housing 520 and the first lower housing 524. A pair of hinge holes 522 formed in each of the first upper housing 520 and the first lower housing 524 may be aligned in a vertical direction.

The hinge hole 522 may be disposed at a position spaced apart from each other by a predetermined distance from the first end portion to the second end portion of each of the first upper housing 520 and the first lower housing 524.

In the present embodiment, the first end portion is an end portion adjacent to the second housing 530, and the second end portion is an end portion opposite to the first end portion.

The second housing 530 may be rotatably connected to the first housing 510. For example, the second housing 530 may be relatively rotatably connected to the first housing 510 based on a first joint (or a first rotational center).

The first housing 510 may rotate only in the first direction with respect to the second housing 530 while the first door 21 is opened in a state in which the first door 21 is closed. In the present embodiment, the first direction means a clockwise direction based on FIG. 7.

For example, in a state in which the first door 21 is closed, the first housing 510 may include a first contact surface 511 contacting the front surface 531 of the second housing 530, and a first inclined surface 512 extending from the first contact surface 511. When the first door 21 is closed, the first inclined surface 512 is spaced apart from the front surface 531 of the second housing 530.

While the first door 21 is opened, the first contact surface 511 is spaced apart from the front surface 531 of the second housing 530, and when the first door 21 is maximally opened, the first inclined surface 512 may contact the front surface 531 of the second housing 530. Of course, even when the first door 21 is maximally opened, the first inclined surface 512 may be spaced apart from the front surface 531 of the second housing 530.

When the first door 21 is closed, a space S may be formed between the first inclined surface 512 and the front surface 531 of the second housing 530.

The space S allows the first housing 510 to rotate in the first direction with respect to the second housing 530 while the first door 21 is opened.

The basic structure of the second housing 530 may be the same as or similar to that of the first housing 510.

For example, the second housing 530 may include a second upper housing 540 and a second lower housing 545 coupled to the second upper housing 540.

By combining the second upper housing 540 and the second lower housing 545, a passage through which the water pipe 72 and the wire 74 can be positioned may be formed. In another aspect, the second lower housing 545 may form the passage and the second upper housing 540 may cover the passage.

When the water pipe 72 and the wire 74 are accommodated in the second housing 530, exposure of the water pipe 72 and the wire 74 to the outside can be minimized.

A coupling structure between the second upper housing 540 and the second lower housing 545 may be the same as or similar to a coupling structure between the first upper housing 520 and the first lower housing 524.

For example, the second upper housing 540 may include a hook 543, and the second lower housing 545 may include a guide groove 548 and a hook slot 549.

The second upper housing 540 and the second lower housing 545 may include hinge portions to be coupled to the hinge holes 522 of the first upper housing 520 and the first lower housing 524.

The hinge portion may include hinge bodies 541 and 546 extending from the second upper housing 540 and the second lower housing 545 toward the first housing 510, and hinge pins 541a and 546a protruding from the hinge bodies 541 and 546 and passing through the hinge hole 522.

The hinge bodies 541 and 546 may extend from the second upper housing 540 and the second lower housing 545 toward the first housing 510 in the longitudinal direction (X-axis direction). The hinge pins 541a and 546a may protrude from the hinge bodies 541 and 546 in a direction (Z-axis direction) crossing the extension direction of the hinge bodies 541 and 546.

Protruding lengths of the hinge pins 541a and 546a may be greater than thicknesses (in the Z-axis direction) of the first upper housing 520 and the first lower housing 524.

The hinge body 541 of the second upper housing 540 may be positioned above the first upper housing 520. The hinge pin 541a of the second upper housing 540 may protrude downward from the lower surface of the hinge body 541. Accordingly, the hinge pin 541a of the second upper housing 540 may pass through the hinge hole 522 of the first upper housing 520.

The hinge body 546 of the second lower housing 545 may be positioned below the first lower housing 524. The hinge pin 546a of the second lower housing 545 may protrude upward from the upper surface of the hinge body 546. Accordingly, the hinge pin 546a of the second lower housing 545 may pass through the hinge hole 522 of the first lower housing 524.

The outer diameters of the hinge pins 541a and 546a may be equal to or smaller than the diameter of the hinge hole 522. One or more protrusions 541b in a horizontal direction from the hinge pins 541a and 546a may protrude so that separation from the hinge hole 522 is minimized while the hinge pins 541a and 546a pass through the hinge hole 522. When the plurality of protrusions 541b are provided on the hinge pins 541a and 546a, the plurality of protrusions 541b may be disposed symmetrically with respect to the hinge pins 541a and 546a.

The protrusion 541b may be inserted into the first housing 510 through the hinge hole 522 together with the hinge pins 541a and 546a. After the protrusion 541b passes through the hinge hole 522 together with the hinge pins 541a and 546a, the protrusion 541b is caught on the inner wall of the first housing 510 to prevent the hinge pin 541a, 546a from being easily separated.

Contrary to what has been described above, it is also possible that the second housing 530 includes a hinge hole and the first housing 510 includes a hinge portion coupled to the hinge hole.

The third housing 550 may be rotatably connected to the second housing 530. For example, the third housing 550 may be relatively rotatably connected to the second housing 530 based on a second joint (or a second rotational center).

The second housing 530 can rotate only in the first direction with respect to the third housing 550 while the first door 21 is opened in a state in which the first door 21 is closed.

For example, when the first door 21 is closed, the second housing 530 may include a second contact surface 532 contacting the front surface 551 of the third housing 550, and a second inclined surface 533 extending from the second contact surface 532. When the first door 21 is closed, the second inclined surface 533 is spaced apart from the front surface 551 of the third housing 550.

While the first door 21 is opened, the second contact surface 532 is spaced apart from the front surface 551 of the third housing 550, and when the first door 21 is maximally opened, the second inclined surface 533 may contact the front surface 551 of the third housing 550. Of course, even when the first door 21 is maximally opened, the second inclined surface 533 may be spaced apart from the front surface 551 of the third housing 550.

When the first door 21 is closed, a space S may be formed between the second inclined surface 533 and the front surface 551 of the third housing 550.

The space S allows the second housing 530 to rotate in the first direction with respect to the third housing 550 while the first door 21 is opened.

A basic structure of the third housing 550 may be the same as or similar to that of the second housing 530. However, the length of the third housing 550 may be longer than the lengths of the first housing 510 and the second housing 530.

When the length of the third housing 550 is longer than the lengths of the first housing 510 and the second housing 530, the lengths of the water pipe 72 and the wire 74 located outside the cabinet 10 are greater than the moving distances of the water pipe 72 and the wire 74 moving together with the first door 21 while the first door 21 is opened. Accordingly, movement of the water pipe 72 and the wire 74 on the protective guide 120 while the first door 21 is opened can be prevented.

For example, the third housing 550 may include a third upper housing 560 and a third lower housing 565 coupled to the third upper housing 560.

By combining the third upper housing 560 and the third lower housing 565, a passage through which the water pipe 72 and the wire 74 can be positioned may be formed. In another aspect, the third lower housing 565 may form the passage and the third upper housing 560 may cover the passage.

When the water pipe 72 and the wire 74 are accommodated in the third housing 550, exposure of the water pipe 72 and the wire 74 to the outside can be minimized.

A coupling structure between the third upper housing 560 and the third lower housing 565 may be the same as or similar to a coupling structure between the second upper housing 540 and the second lower housing 545.

For example, the third upper housing 560 may include a hook 563, and the third lower housing 565 may include a guide groove 568 and a hook slot 569.

The third upper housing 560 and the third lower housing 565 may include hinge portions to be coupled to the hinge holes 544 of the first upper housing 540 and the first lower housing 545.

The hinge portion may include hinge bodies 561 and 566 extending from the third upper housing 560 and the third lower housing 565 toward the second housing 530, and a hinge pin 567 protruding from the hinge bodies 561 and 566 and passing through the hinge hole 544.

The hinge bodies 561 and 566 may extend in the longitudinal direction (X-axis direction) from the third upper housing 560 and the third lower housing 565. The hinge pin 567 may protrude from the hinge bodies 561 and 566 in a direction (Z-axis direction) crossing the extension direction of the hinge bodies 561 and 566.

The protruding length of the hinge pin 557 may be greater than the thicknesses (Z-axis direction) of the second upper housing 540 and the second lower housing 545.

The hinge body 561 of the third upper housing 560 may be positioned above the second upper housing 540. The hinge pin 567 of the third upper housing 560 may protrude downward from the lower surface of the hinge body 561. Accordingly, the hinge pin 567 of the third upper housing 560 may pass through the hinge hole 544 of the second upper housing 540.

The hinge body 566 of the third lower housing 565 may be positioned below the second lower housing 545. The hinge pin 567 of the third lower housing 565 may protrude upward from the upper surface of the hinge body 566. Accordingly, the hinge pin 567 of the third lower housing 565 may pass through the hinge hole 544 of the second lower housing 545. The aforementioned protrusion may also be provided on the hinge pin 567.

Contrary to what has been described above, it is also possible that the third housing 550 includes a hinge hole and the third housing 530 includes a hinge portion coupled to the hinge hole.

The guide housing 50 may further include a guide rib 570. The cabinet guide 40 may include a guide slot (to be described later) for accommodating the guide rib 570 and guiding the movement of the guide rib 570.

For example, the guide rib 570 may be provided in the third housing 530. The guide rib 570 may protrude in a horizontal direction from at least one side of the third housing 550. For example, the guide rib 570 may extend in the Y-axis direction crossing the longitudinal direction in the horizontal direction in the third housing 550. The guide slot may guide the movement of the guide rib 570 in the longitudinal direction.

A lower extension portion 572 extending downward at a position spaced apart from the guide rib 570 in the third housing 550 and a limiting rib 574 protruding from the lower extension portion 572 are further included.

The limiting rib 574 may restrict movement of the third housing 550 in the vertical direction (Z-axis direction) during the movement of the third housing 530 in the longitudinal direction.

In a state in which the first door 21 is closed, the first to third housings 510, 530, and 550 may be disposed to extend in a straight line form. While the first door 21 is opened, two adjacent housings of the first to third housings 510, 530, and 550 may be relatively rotated.

Figure 11:
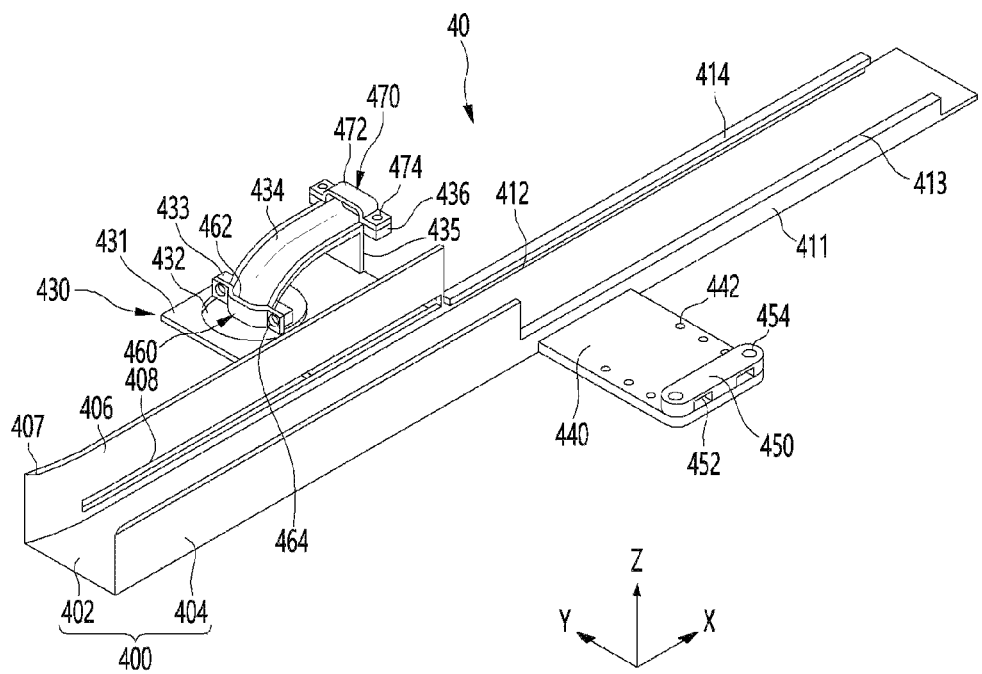
FIG. 11 is a perspective view illustrating the cabinet guide of the present embodiment.
Figure 12:
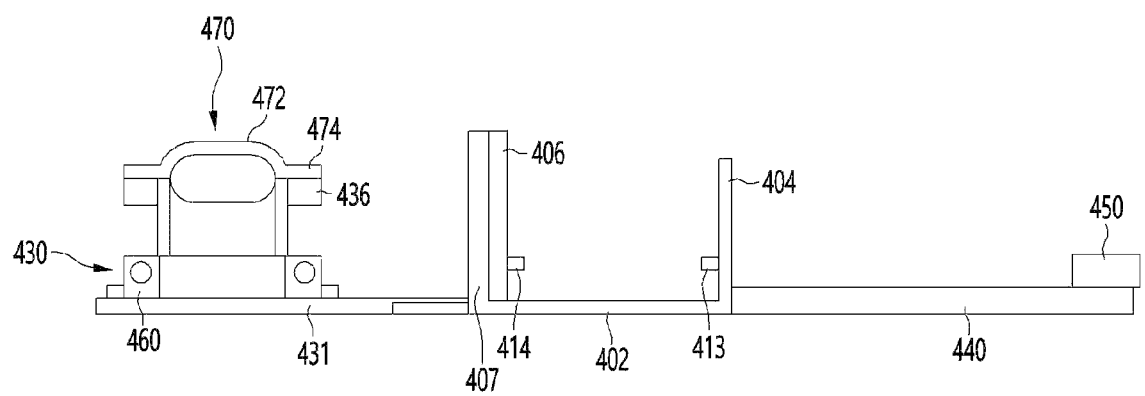
FIG. 12 is a front view illustrating the cabinet guide.
Figure 13:
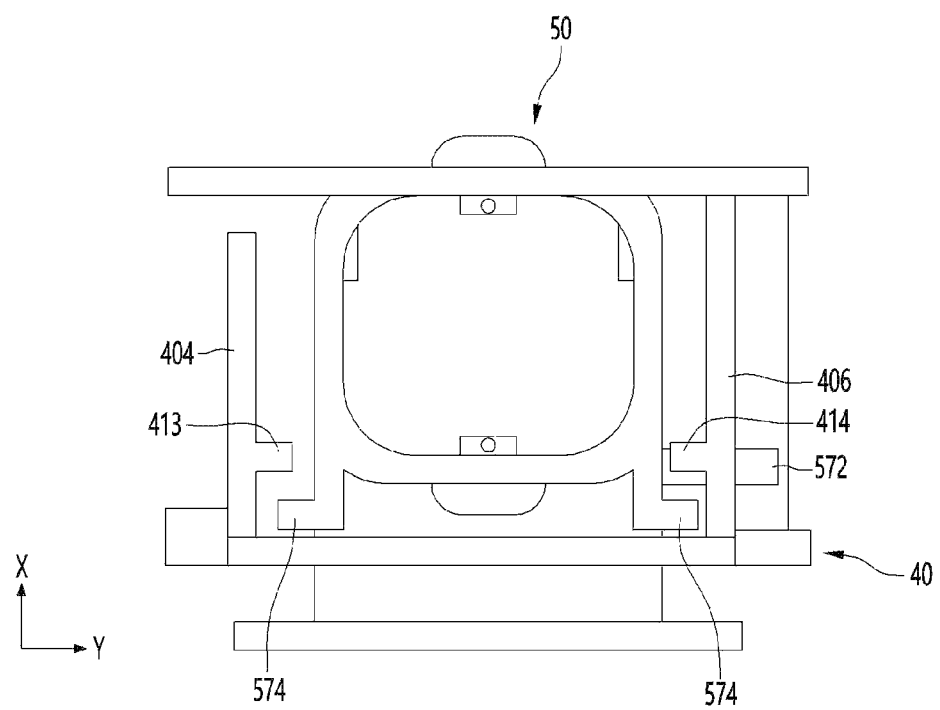
FIG. 13 is a view illustrating a state where a guide housing is coupled to a cabinet guide as viewed from a side of a third housing.
Figure 14:
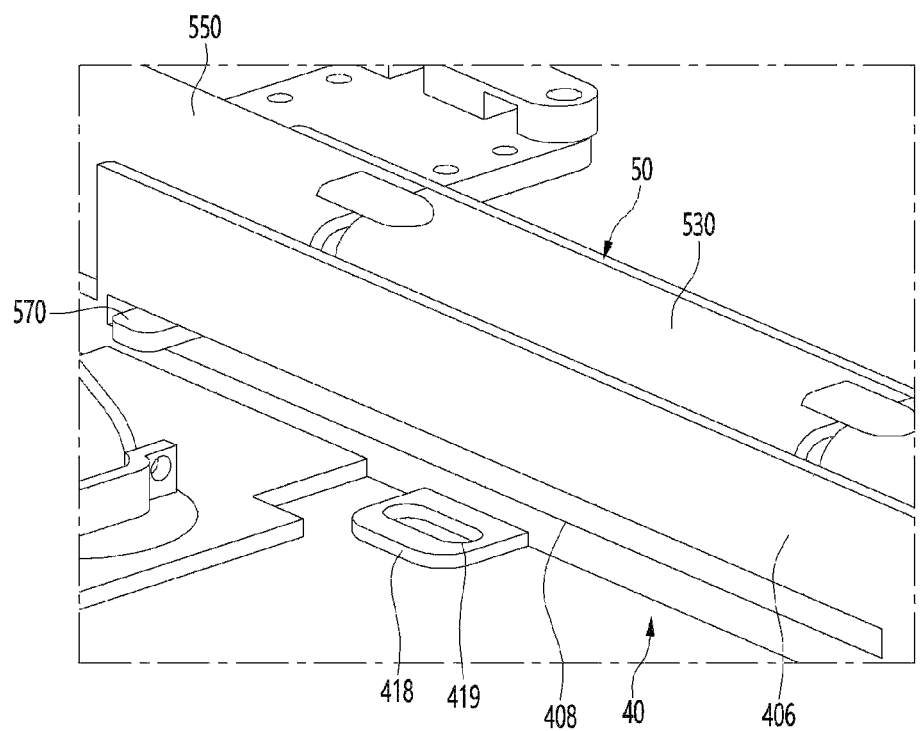
FIG. 14 is a partial perspective view illustrating a state where the guide housing is coupled to the cabinet guide.

FIG. 11 is a perspective view illustrating the cabinet guide of the present embodiment, FIG. 12 is a front view illustrating the cabinet guide, FIG. 13 is a view illustrating a state where a guide housing is coupled to a cabinet guide as viewed from a side of a third housing, and FIG. 14 is a partial perspective view illustrating a state where the guide housing is coupled to the cabinet guide.

Referring to FIGS. 11 to 14, the cabinet guide 40 may include a guide body 400 movably supporting the guide housing 50.

The guide body 400 may include a bottom wall 402 seated on the cabinet 10. The guide body 400 may further include a plurality of front side walls 404 and 406 extending upward from both sides of the bottom wall 402.

The bottom wall 402 may be formed long in the longitudinal direction.

The plurality of front sidewalls 404 and 406 may include a first sidewall 404 and a second sidewall 406 spaced apart from the first sidewall 404. The second sidewall 406 may be located to the left of the first sidewall 404.

The first sidewall 404 and the second sidewall 406 may extend from the front end portion of the bottom wall 402 toward the rear end portion. Lengths of the first sidewall 404 and the second sidewall 406 may be shorter than the length of the bottom wall 402.

The guide housing 50 may be positioned in a space between the first sidewall 404 and the second sidewall 406.

When the first door 21 is closed, the distance between the first sidewall 404 and the second sidewall 406 is greater than the width (Y-axis direction) of the guide housing 50 in the left and right direction.

In the case of the present embodiment, while the first door 21 rotates, at least a portion of the guide housing 50 may not only move linearly, but also rotate horizontally.

The linear movement means that the guide housing moves in the first axis direction or along the first axis of three axes.

Movement of the guide housing in a biaxial direction may be divided into biaxial direction oblique movement (hereinafter referred to as "oblique movement") and rotational movement.

In the present specification, the oblique movement means that the entirety of each housing moves in the Y-axis direction while moving in the X-axis direction, and the oblique direction means a direction that is not perpendicular to the front surface of the cabinet.

The rotational movement means that displacement in the Y-axis direction is different for each point of each housing when the guide housing moves in biaxial direction. In general, rotation of a housing around a joint of two adjacent housings may be referred to as rotational movement.

For example, in the present embodiment, movement only in the X-axis direction may be referred to as linear movement, and movement in the X-axis and Y-axis directions may be defined as oblique movement or rotational movement.

When the distance between the first sidewall 404 and the second sidewall 406 is greater than the width (Y-axis direction) of the guide housing 50 in the left and right direction, the first sidewall 404 and the second sidewall 406 may guide rotational movement as well as linear movement of the guide housing 50.

At least one of the first sidewall 404 and the second sidewall 406 may include an inclined wall. For example, the inclined wall may be located on any one of the first sidewall 404 and the second sidewall 406 which is located close to the hinge apparatus 80.

The second sidewall 406 may include an inclined wall 407. For example, the inclined wall 407 may be disposed adjacent to the first door 21 when the first door 21 is closed. Therefore, the distance between the first sidewall 404 and the second sidewall 406 may be constant from the rear side of the cabinet 10 toward the first door 21 but may increase at the inclined wall 407 side.

If the inclined wall 407 is provided only on a certain portion of the second sidewall 406, the distance from the first sidewall 404 may be reduced in the rest of the second sidewall 406 except for the inclined wall 407, and the rotation angle of the guide housing 50 can be increased on the inclined wall 407 side. Accordingly, interference with the guide housing 50 can be prevented while reducing the overall volume of the cabinet guide 40.

At least one of the first sidewall 404 and the second sidewall 406 may be provided with a guide slot 408 into which the guide rib 570 is inserted. FIG. 11 illustrates a state where the guide slot 408 is provided on the second side wall 406 as an example.

The heights of the first sidewall 404 and the second sidewall 406 may be the same or different.

The guide body 400 may further include a plurality of rear sidewalls positioned behind the plurality of front sidewalls 404 and 406.

The plurality of rear sidewalls extend upward from the bottom wall 402 and may have a height lower than those of the plurality of front sidewalls 404 and 406. Of course, it is also possible that the height of the plurality of rear side walls is the same as those of the pair of front side walls 404 and 406.

The plurality of rear sidewalls may include a third sidewall 411 extending rearwardly from the first sidewall 404 and a fourth sidewall 412 extending rearwardly from the second sidewall 406.

Limiting walls 413 and 414 may be provided on at least one of the third sidewall 411 and the fourth sidewall 412. FIG. 13 illustrates, for example, a state where the limiting walls 413 and 414 are provided on each of the third sidewall 411 and the fourth sidewall 412.

The limiting walls 413 and 414 may extend in a horizontal direction from upper end portions of the third sidewall 411 and the fourth sidewall 412. For example, the limiting walls 413 and 414 on each of the third sidewall 411 and the fourth sidewall 412 may extend in a direction closer to each other.

The limiting walls 413 and 414 may elongate from the third sidewall 411 and the fourth sidewall 412 in the longitudinal direction of the guide body 400.

As another example, the third sidewall 411 and the first sidewall 404 may not be distinguished, and the third sidewall 411 may be a portion of the first sidewall 404. In addition, the fourth sidewall 412 and the second sidewall 406 may not be distinguished, and the fourth sidewall 412 may be a portion of the second sidewall 406. In this case, it can be described that the limiting walls 413 and 414 are formed on the first sidewall 404 and the second sidewall 406.

Referring to FIG. 13, the limiting rib 574 may be positioned below the limiting walls 413 and 414. The limiting rib 574 may be located below the limiting walls 413 and 414. The limiting rib 574 may be spaced apart from or positioned close to the limiting walls 413 and 414 at a lower side of the limiting walls 413 and 414.

When the limiting rib 574 contacts the lower surfaces of the limiting walls 413 and 414, the upward movement of the limiting rib 574 may be restricted. Therefore, while the first door 21 is opened, a phenomenon in which the third housing 550 is lifted upward from the guide housing 50 can be prevented.

To prevent friction between the side of the guide housing 50 and the limiting walls 413 and 414, a distance between a pair of limiting walls 413 and 414 may be greater than a width of the guide housing 50 in a horizontal direction.

The guide body 400 may further include one or more coupling walls 418. The coupling wall 418 extends in a horizontal direction from the guide body 400 and may be seated on the upper surface of the cabinet 10. A through hole 419 through which a fastening member passes may be formed in the coupling wall 418.

The cabinet guide 40 may further include a guide portion 430 extending in one direction from the guide body 400.

The guide portion 430 may guide the water pipe 72 drawn out from the cabinet 10 toward the guide housing 50. The guide portion 430 may be located behind the hinge apparatus 80.

A portion of the hinge apparatus 80 may be positioned between the guide portion 430 and the first door 21.

The guide portion 430 may include an extension wall 431 extending horizontally from the guide body 400. The extension wall 431 may extend from a position adjacent to the second sidewall 406 in the guide body 400.

The extension wall 431 may include an opening 432 through which the water pipe 72 passes. The water pipe 72 drawn out from the cabinet 10 may pass through the opening 432.

The guide portion 430 may include a support wall 434 supporting the water pipe 72 passing through the opening 432. The support wall 434 may extend in a direction away from the first door 21 from the extension wall 431.

For example, the support wall 434 may extend to be inclined toward the rear side at a position adjacent to the opening 432 of the extension wall 431.

At this time, it is also possible that the extension wall 431 does not include the opening 432. In this case, the water pipe 72 drawn out from the cabinet 10 may be directly supported by the support wall 434.

The support wall 434 may increase in height as the distance from the opening 432 to the rear side increases. The support wall 434 may be rounded so as to be convex downward based on a vertical section obtained by cutting the support wall 434 in the Y-axis direction so that the support wall 434 can stably support the water pipe 72.

The guide portion 430 may further include a connection wall 435 connecting the extension wall 431 and the support wall 434.

The cabinet guide 40 may further include a first cover member 460 coupled to the first guide portion 430 while covering the water pipe 72 so that the water pipe 72 remains a state of being seated on the support wall 434.

The first cover member 460 may include a rounded portion 462 covering the water pipe 72 and coupling portions 464 provided on both sides of the rounded portion 462.

The rounded portion 462 may be rounded in a direction opposite to the rounding direction of the support wall 434 based on the water pipe 72. Accordingly, the water pipe 72 may be positioned between the support wall 434 and the rounded portion 462. The support wall 434 may be provided with a first fastening extension portion 433 to be fastened to the fastening portion 464 by a fastening member.

The cabinet guide 40 may further include a second cover member 470 coupled to the guide portion 430 while covering the water pipe 72 so that the water pipe 72 remains a state of being seated on the support wall 434. The second cover member 470 may be coupled to the guide portion 430 at a position spaced apart from the first cover member 460 in the longitudinal direction.

A structure of the second cover member 470 may be the same as that of the first cover member 462. For example, the second cover member 470 may include a rounded portion 472 and a pair of coupling portions 474.

A second fastening extension portion 436 for fastening with the coupling portion 474 by a fastening member may be provided at a position adjacent to the extension wall 435 in the connection wall 435 or the support wall 434.

The cabinet guide 40 may further include a fixing wall 440 used to fix the position of the wire 74. The fixing wall 440 may be located on the opposite side of the guide portion 430 in the guide body 400. The fixing wall 440 may extend horizontally from the guide body 400.

A coupling member 450 to which a cable tie is coupled may be provided on the fixing wall 440.

A plurality of holes 442 may be formed in the fixed wall 440 in the X-axis direction, as well as a plurality of holes 442 may be formed in the fixed wall in the Y-axis direction. The coupling member 450 may be fastened to a first hole among the holes 442 arranged in the Y-axis direction and a second hole spaced apart from the first hole in the Z-axis direction by a fastening member.

Accordingly, the position of the coupling member 450 on the fixing wall 440 can be varied.

The coupling member 450 may include a plurality of fastening holes 454. The coupling member 450 may further include one or more slots 452 through which the cable tie is coupled. The cable tie may pass through the slot 452 and be coupled to surround the coupling member 450 and the wire 74.

After the wire 74 is placed between the guide body 400 and the coupling member 450, when the wire 74 and the coupling member 450 are coupled using the cable tie, the position of the wire 74 can be fixed.

Figure 15:
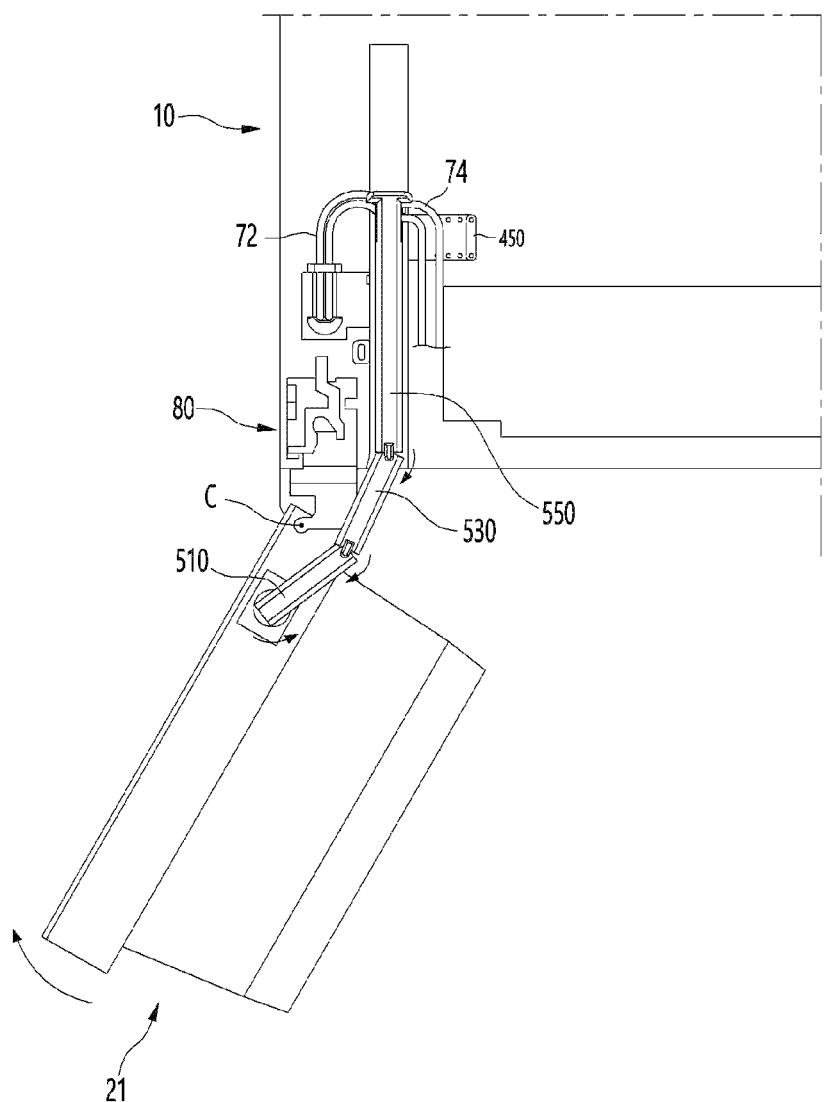
FIG. 15 is a plan view illustrating a state where the first door of the present disclosure is opened by the maximum angle.
Figure 16:
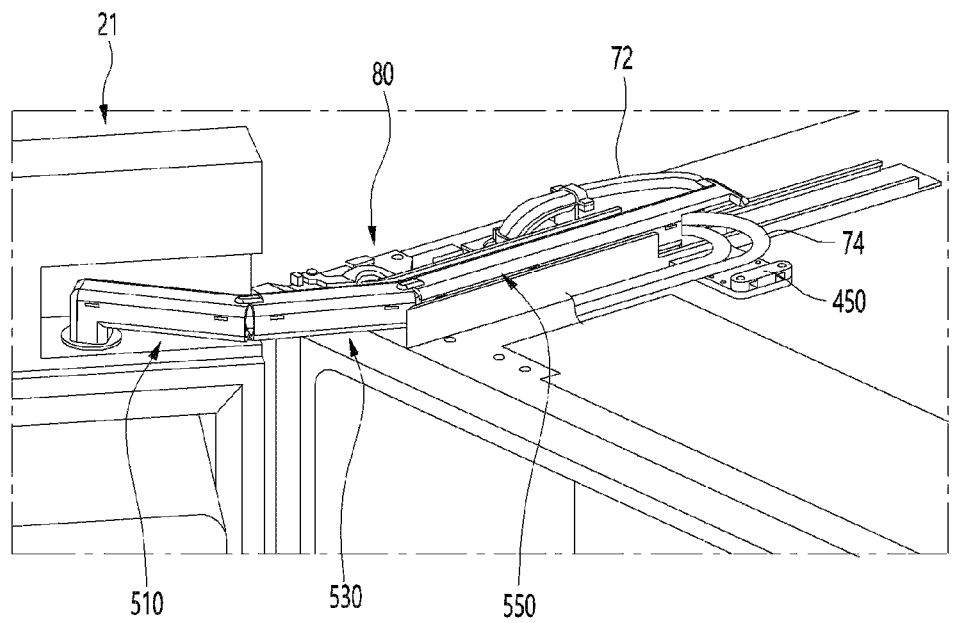
FIG. 16 is a perspective view illustrating a state where the first door of the present disclosure is opened by the maximum angle.

FIG. 15 is a plan view illustrating a state where the first door of the present disclosure is opened by the maximum angle, and FIG. 16 is a perspective view illustrating a state where the first door of the present disclosure is opened by the maximum angle Referring to FIGS. 3 to 16, the first door 21 is provided with the above-described door opening 214, and the first housing 510 is rotatably connected to the first door 21 with the door fixing portion 90 at the upper side of the door opening 214.

In this case, the center of the door opening 214 may be the same as or different from the rotational center of the first housing 510. The rotational center C2 of the first housing 510 may pass through the door opening 214.

To open the first door 21, the first door 21 may be rotated in a first direction (clockwise direction in the drawing).

While the first door 21 is opened, the third housing 550 is guided by the cabinet guide 40 and may move in a direction closer to the first door 21.

The third housing 550 may linearly move in a direction closer to the first door 21 and then may perform an oblique or rotational movement.

In the present embodiment, the rotation angle means an angle when each housing is rotated in the first direction.

In addition, when the rotation angle of each housing is increased, it means that the movement distance in the X-axis direction is reduced and the movement distance in the Y-axis direction is increased.

While the first door 21 is opened, the second housing 530 may move in a direction closer to the first door 21.

For example, the second housing 530 may linearly move in a direction closer to the first door 21 and then perform an oblique or rotational movement. Alternatively, the second housing 530 may perform a rotational movement while performing an oblique movement in a direction closer to the first door 21.

While the first door 21 is opened, the first housing 510 may move in a direction closer to the first door 21.

For example, the first housing 510 may linearly move in a direction closer to the first door 21 and then perform an oblique or rotational movement. As another example, the first housing 510 may perform a rotational movement while performing an oblique movement in a direction closer to the first door 21.

While the first door 21 is opened, the first housing 510 may be rotated with respect to the first door 21. In addition, the first housing 510 may be rotated with respect to the second housing 530. In addition, the second housing 530 may be rotated with respect to the third housing 550.

While the first door 21 is opened, the angle between the first housing 510 and the front surface of the first door 21 may increase.

In a state in which the first door 21 is opened at the maximum angle, the entirety of the first housing 510 may be drawn out of the cabinet guide 40. In addition, the second housing 530 may be drawn out of the cabinet guide 40.

In a state in which the first door 21 is opened at the maximum angle, the second housing 530 is located at the side of the hinge apparatus 80.

In this case, since the second housing 530 does not interfere with the hinge apparatus 80 and the second housing 530 covers the side surface of the hinge apparatus 80, exposure of the hinge apparatus 80 to the user can be minimized.

When the first door 21 is opened to the maximum angle in a closed state, the rotation angle of the first housing 510 relative to the second housing 530 is greater than the rotation angle of the second housing 530 relative to the third housing 550.

In the present embodiment, while the first door 21 is opened, portions of the water pipe 72 and the wire 74 may be bent. However, since not only the first housing 510 and the second housing 530 rotate relative to each other, but also the second housing 530 rotates with respect to the third housing 550, there is an advantage in that the radius of curvature of the bent portion of the water pipe 72 and the wire 74 is increased and thus the amount of bending can be reduced.

In the present specification, a wire and a pipe through which a liquid (for example, water) flows may be collectively referred to as an extension member. The extension member may be drawn out from the cabinet and extended into the refrigerator door, or drawn out from the refrigerator door and extended into the cabinet.

The invention claimed is:

1. A refrigerator comprising:
a cabinet having a storage space;
a refrigerator door rotatably connected to the cabinet by a hinge apparatus and configured to open and close the storage space;
a housing configured to guide at least one of a wire or a pipe through which liquid flows between the cabinet and the refrigerator door; and
a cabinet guide fixed to the cabinet and configured to guide a movement of the housing while the refrigerator door is opened and closed,
wherein the cabinet guide includes a guide slot extending in a longitudinal direction of the cabinet guide; and
wherein the housing includes a guide rib accommodated in the guide slot.

2. The refrigerator of claim 1,
wherein the cabinet guide includes a bottom wall fixed to the cabinet, and first and second side walls extending away from the cabinet from opposing sides of the bottom wall, and
wherein the housing is positioned between the first sidewall and the second sidewall.

3. The refrigerator of claim 2,
wherein at least one of the first sidewall or the second sidewall includes the guide slot.

4. The refrigerator of claim 2,
wherein a distance between the first sidewall and the second sidewall is greater than a width of the housing in a direction parallel to a front surface of the cabinet.

5. The refrigerator of claim 2,
wherein the second sidewall is located closer to the hinge apparatus than the first sidewall, and
wherein the second sidewall includes an inclined wall extending in a direction away from the first sidewall.

6. The refrigerator of claim 5,
wherein the inclined wall is located at an end of the second side wall that is adjacent to the refrigerator door.

7. The refrigerator of claim 1,
wherein the housing is configured to guide the pipe; and
wherein the cabinet guide further includes at least one guide wall extending in one direction and configured to guide the pipe toward the housing.

8. The refrigerator of claim 7,
wherein the at least one guide wall includes:
an extension wall extending in a horizontal direction; and
a support wall extending from the extension wall in a direction away from the refrigerator door and configured to support the pipe.

9. The refrigerator of claim 8,
wherein the extension wall includes an opening through which the pipe passes.

10. The refrigerator of claim 8,
wherein a height of the support wall increases in a direction along on an upper surface of the cabinet and away from the refrigerator door.

11. The refrigerator of claim 8,
wherein a vertical cross section of the support wall is rounded to be convex downward.

12. The refrigerator of claim 8, further comprising:
one or more covers coupled to the at least one guide wall to surround the pipe seated on the support wall.

13. The refrigerator of claim 7,
wherein the housing is further configured to guide the wire; and
wherein the cabinet guide includes:
a side wall,
a fixing wall extending from the side wall; and
a coupling member coupled to the fixing wall and configured to guide the wire,
wherein, the wire is positioned between the coupling member and the side wall of the cabinet guide, and the wire is coupled to the coupling member.

14. The refrigerator of claim 13,
wherein the fixing wall includes a first plurality of holes arranged in a first direction and a second plurality of holes arranged in a second direction crossing the first direction.

15. The refrigerator of claim 1,
wherein the cabinet guide further includes at least one coupling wall extending in a horizontal direction and seated on an upper surface of the cabinet.

16. The refrigerator of claim 15,
wherein the at least one coupling wall includes a through-hole through which a fastener passes to couple the cabinet guide to the cabinet.

17. A refrigerator comprising:
a cabinet having a storage space;
a refrigerator door rotatably connected to the cabinet by a hinge apparatus and configured to open and close the storage space;
a housing configured to guide at least one of a wire or a pipe through which liquid flows between the cabinet and the refrigerator door; and
a cabinet guide fixed to the cabinet and configured to guide a movement of the housing while the refrigerator door is opened and closed,
wherein the cabinet guide includes a bottom wall fixed to the cabinet, first and second side walls extending away from the cabinet from opposing sides of the bottom wall, a third sidewall extending rearwardly from the first sidewall and a fourth sidewall extending rearwardly from the second sidewall; and
wherein upper ends of the third and fourth sidewalls are lower than upper ends of the first and second sidewalls.

18. The refrigerator of claim 17,
wherein at least one of the third sidewall or the fourth sidewall includes a limiting wall protruding in a direction between the fourth sidewall and the third sidewall, and
wherein the housing includes a limiting rib protruding from the housing in a horizontal direction and positioned below the limiting wall.

19. The refrigerator of claim 18,
wherein each of the third sidewall and the fourth sidewall includes the limiting wall, and
wherein a distance between the limiting walls in a left and right direction parallel to a front surface of the cabinet is greater than a width of the housing in the left and right direction.

20. A refrigerator comprising:
a cabinet having a storage space;
a refrigerator door rotatably connected to the cabinet by a hinge apparatus and configured to open and close the storage space;
a housing configured to guide at least one of a wire or a pipe through which liquid flows between the cabinet and the refrigerator door; and
a cabinet guide fixed to the cabinet and configured to guide a movement of the housing while the refrigerator door is opened and closed,
wherein the cabinet guide includes a guide wall configured to guide the pipe and a fixing wall configured to guide the wire, and
wherein the fixing wall to guide the wire is located at an opposite side the cabinet guide relative to the guide wall to guide the pipe.

\* \* \* \* \*